United States Patent [19]

Keener et al.

[11] Patent Number: 4,614,235

[45] Date of Patent: Sep. 30, 1986

[54] USE OF MONO AND POLYALKYLENE GLYCOL ETHERS AS AGENTS FOR THE RELEASE OF DIFFERENTIALLY STUCK DRILL PIPE

[75] Inventors: Ivian G. Keener, Houston; John C. Newlove, Kingwood; Robert C. Portnoy, Houston; Daniel F. Fehler, Houston; Kenneth W. Pober, Houston, all of Tex.

[73] Assignee: Exxon Chemical Patents Inc., Florham Park, N.J.

[21] Appl. No.: 723,608

[22] Filed: Apr. 15, 1985

[51] Int. Cl.[4] ............................................. E21B 31/03
[52] U.S. Cl. ................................... 166/301; 252/8.551
[58] Field of Search ................... 166/301; 252/8.5 A, 252/8.5 C, 8.55 R, 8.55 B

[56] References Cited

U.S. PATENT DOCUMENTS

| | | | |
|---|---|---|---|
| 3,126,970 | 3/1964 | Rygg | 166/301 X |
| 3,217,802 | 11/1965 | Reddie et al. | 166/301 |
| 3,328,295 | 6/1967 | Lummus et al. | 166/301 X |
| 4,230,587 | 10/1980 | Walker | 166/301 X |
| 4,436,638 | 3/1984 | Walker et al. | 166/301 X |
| 4,464,269 | 8/1984 | Walker et al. | 166/301 X |
| 4,466,486 | 8/1984 | Walker | 166/301 |
| 4,491,181 | 1/1985 | Krol | 166/301 |
| 4,494,610 | 1/1985 | Walker | 166/301 |

*Primary Examiner*—Stephen J. Novosad
*Attorney, Agent, or Firm*—R. A. Dexter; R. L. Graham

[57] ABSTRACT

A formulation suitable for preparation of a spotting pill effective in the release of stuck pipe in a borehole during a drilling operation which formulation contains a mono and/or poly alkylene glycol ether and viscosified sufficiently to make the formulation compatible with a solids weighting material such as barite.

7 Claims, No Drawings

USE OF MONO AND POLYALKYLENE GLYCOL ETHERS AS AGENTS FOR THE RELEASE OF DIFFERENTIALLY STUCK DRILL PIPE

FIELD OF INVENTION

This invention relates to new formulations useful in drilling operations wherein the drill string is stuck in the hole and cannot be readily released. More particularly, it relates to drilling operation problems involving drill pipe stuck due to differential pressures and a water based chemical approach to overcoming said problems.

BACKGROUND OF THE INVENTION

The drilling of oil and gas wells by the rotary technique involves the circulation of a drilling fluid through the drill string and out the bit nozzles and its return to the surface via the annulus. This fluid cools and lubricates the drill string, develops sufficient hydrostatic head to counterbalance formation pressures, and removes the cuttings from the borehole. This fluid also helps reduce the frictional forces between the drill string and the borehole or casing.

During the drilling operation the drill string may become stuck and cannot be raised, lowered, or rotated. There are a number of mechanisms possible which may contribute to this problem. Namely these are (1) cuttings or slough build-up in the hole; (2) an undergage hole; (3) key-seating; and, (4) differential pressures.

Differential sticking may be defined as the sticking of the drill string against a permeable formation containing less pore fluid pressure than the hydrostatic pressure exerted by the drilling fluid column and usually occurs when the drill string remains motionless for a period of time. The mechanism by which this occurs involves the drill string coming into contact with a mud filter cake built up against a permeable zone, remaining quiescent for a period of time sufficient for the drill pipe to be pressed into the mud cake by excessive pressure in the borehole, and thus being sealed against the wall of the borehole. The annular pressure exerted by the drilling fluid then holds the pipe against the borehole wall in the permeable zone.

Freeing of differentially stuck pipe is essentially a matter of reducing this pressure differential which exists across the pipe. One method used simply involves a reduction in fluid pressure by replacing the annular fluid with a less dense fluid such as diesel or crude oil allowing for less pressure differential to exist between the borehole and formation. In some cases the formation pressure may exceed the annular pressure which in turn allows the pipe to be blown away from the borehole wall. Oftentimes, it is unsafe to perform this operation since there is a high likelihood of a harmful blow-out of the well.

Release of stuck drill pipe is achieved conventionally by the placement in and by movement through the circulating mud system of a volume of a release agent sufficient to fully contact the region of the borehole where the pipe is stuck. This method is colloquially known as "spotting a pill". The most commonly used current method to release stuck pipe is the spotting of a pill of a suitably densified, surfactant fortified oil mud in the hole opposite the stuck interval. With time, the integrity of the mud filter cake between the drill pipe and borehole is reduced by the oil mud allowing pressure equalization on all sides of the pipe. Also, oil invasion into the mud cake reduces the adhesive forces and lubricates the area between the pipe and borehole resulting in less friction and quicker release.

In recent years, there have been a number of oil-based proprietary formulations developed which are aimed at releasing differentially stuck pipe, which formulations include: petroleum oil containing a material selected from the group consisting of 2-heptadecenyl-4-4-dimethoxy-2-oxazoline; 2-heptadecenyl-4-methoxy-4-methyl-2-oxazoline; the sodium salt of dioctyl sulfosuccinate; a mixture of a product containing high molecular weight free fatty acids, esters and alcohols made by acid cracking wool grease with about one-fourth its weight of the sodium salt of sulfated oleyl alcohol and mixtures thereof in a quantity sufficient to reduce interfacial tension at an interface between the petroleum oil and water to not more than 2 dynes per centimeter (U.S. Pat. No. 3,217,802); and an oil-based spotting fluid which contains propoxylated $C_{18}$–$C_{32}$ alkanols, an oil-soluble emulsifier-wetting agent and if desired an imidazoline for high temperature emulsion stability (U.S. Pat. Nos. 4,436,638 and 4,464,269). Environmental concerns enforced by world-wide government regulations are increasingly limiting the application of oil-based formulations to drilling operations.

The patent literature reports of water-based formulations for the releasing of differentially stuck pipe include: a surface-active agent prepared from about four parts of half ammonium, half isopropylamine salt of the sulfosuccinic acid ester of the oleic acid amide of isopropanol amine and about one part of the isopropylamine salt of dodecylbenzenesulfonic acid which agent is added to the water base drilling fluid (U.S. Pat. No. 3,233,622); a polyethylene glycol having a molecular weight ranging from 106 to about 600 or a saturated salt water solution or a sea water solution of said glycol (U.S. Pat. No. 4,230,587); and an additive composition which comprises a polymer such as hydroxyethylcellulose, carboxymethylcellulose and mixtures thereof in brine or polyethylene oxide, ethylene oxide-propylene oxide copolymer, poly(vinylmethylether) and mixtures thereof in water or brine (U.S. Pat. No. 4,466,486).

There remains a need for improved spotting pills with low toxicity and, particularly, for effective water miscible chemical systems which are drilling fluid compatible and can better release stuck drill pipes, especially those which have improved efficacy for releasing differentially stuck pipe.

SUMMARY OF THE INVENTION

The objects of this invention have been met by an improved method of releasing a stuck drill string in the borehole of an underground formation during drilling operations employing a drilling fluid which comprises contacting said stuck drill string with a spotting pill effective to reduce the annular pressure exerted by the drilling fluid against the stuck drill string and to release said stuck drill string, said pill composition being comprised of an alkylene glycol ether of the class consisting of alkylene glycol ether, poly(alkylene glycol) ether and mixtures thereof.

This has been achieved therefore in accordance with this invention, by the provision of a formulation suitable for the preparation of a spotting pill which formulation comprises by weight:

(a) from 0 to 80% of water; (b) from 20 to 100% of alkylene glycol ether; (c) from at least a viscosifying amount to 5% of a viscosifier which has the property of viscosifying said formulation to make it compatible with a solid weighting material.

In preferred form, the spotting pill is a solids weighted aqueous fluid, said fluid comprising from 30 to 70 percent by weight of a mixture of ethylene glycol monobutyl ether and poly(ethylene glycol) monobutyl ethers with a degree of polymerization in the range of 2 to 5, from 0.2 to 1.0 percent by weight of a copolymer of methacrylic acid and an ethoxylated stearol acrylate, from 0.05 to 0.5 percent by weight of a crosslinked polyacrylamide, from 0.5 to 5 percent by weight of a coconut fatty acid alkanolamide surfactant and the balance, water and said pill being weighted with a sufficient amount of solid weighting material to provide a fluid density appropriate for release of said stuck drill string, said percent by weight being based on the weight of said fluid.

DETAILED DESCRIPTION OF THE INVENTION

The alkylene glycol ethers constituting the pipe release agent of the invention include both the mono and diethers. These alkylene glycol ethers fall within a class of the general formula:

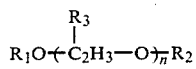

wherein $R_1$ represents hydrogen or a lower alkyl group of from 1 to 8 carbons, $R_2$ represents a lower alkyl group of from 1 to 8 carbons, $R_3$ represents hydrogen, methyl and ethyl, and n represents an integer of 1 to 16, preferably 1 to 5.

The preferred class is the water-miscible ethylene glycol ethers as represented by diethylene glycol monobutyl ether, triethylene glycol monobutyl ether, ethylene glycol monobutyl ether, diethylene glycol diethyl ether, diethylene glycol monobutyl ether, ethylene glycol monobutyl ether, diethylene glycol dimethyl ether, tetraethylene glycol dimethyl ether, diethylene glycol monoethyl ether, diethylene glycol monomethyl ether, ethylene glycol dimethyl ether, triethylene glycol dimethyl ether, ethylene glycol monoethylether, ethylene glycol diethyl ether, diethylene glycol diethyl ether, ethylene glycol monomethyl ether, and poly(ethylene glycol)monomethyl ethers of weight average molecular weight ($\overline{M}w$) ranging up to about 800.

Another preferred class is the water-miscible glycol ethers such as the methyl monoether of propylene glycol, ethyl monoether of propylene glycol, propyl monoether of propylene glycol, methyl monoether of dipropylene glycol and the ethyl monoether of dipropylene glycol.

The glycol ether release agent is most desirably formulated into a spotting pill which approximates the fluid density of the drilling mud in use. In general this means that the pill must be viscous enough to suspend solid weighting materials such as barite and/or hematite, in order to achieve the stipulated fluid density. When the alkylene glycol ether or solution thereof and the weighting material are admixed, the latter component, oftentimes tends to settle out of the fluid, i.e., it is incompatible, in the absence of a viscosifier.

It has been further discovered that aqueous solutions of mono- and polyethylene glycol ethers can be viscosified by the addition of alkali soluble acrylic resin at sufficiently high pH to activate the resin in the system. This viscosification can be maintained, pro-viding the degree of neutralization of the polyionic resin viscosifier does not become so high that the viscosifier is insoluble in the aqueous solution. Furthermore, it has been found that additional viscosity in a "gel structure" can be provided to these ether solutions treated with the alkali soluble polymers by treating them additionally with a supplemental viscosifier, i.e., a water-swellable crosslinked polyacrylamide. The solutions viscosified in these ways will support barite or other high density solid weighting materials over long periods of time. Spotting formulations of this type, prepared from these components, are useful for the release of differentially stuck drill pipe since they combine the pipe release activity of the ether with the fluid density needed for proper downhole application of the spotting pill.

The alkali soluble polyionic acrylic resins are preferably ether solvated polymers such as are represented by copolymers of methacrylic acid and alkyl acrylates and optimally by copolymers of methacrylic acid and ethoxylated stearol ester of acrylic acid wherein the hydrophile-lipophile balance is appropriately adjusted by ethoxylation of the stearol with 20 moles of ethylene oxide per mole of stearol prior to esterification of the acrylic acid. The ether solvated polymers are present in an amount sufficient to viscosify the system to make it compatible with the weighting additive such as barite.

A surfactant is oftentimes incorporated into the formulation in order to facilitate the dispersion and stabilization of the solid weighting materials within the spotting pill. Although earlier exemplified by the preferred surfactant, a coconut fatty acid alkanolamide surfactant, other suitable surfactants include sodium lauryl sulfate, fatty acid salts and dodecylbenzenesulfonic acid salts.

The glycol ether release agent generally is incorporated into the spotting pill in an amount (based on the liquid portion of the spotting pill) ranging from 20 to 100, preferably from 30 to 70, optimally about 50, weight percent. The viscosifier is present in the spotting pill in an amount (based on the liquid of the spotting pill) ranging from 0.1 to 2.0, preferably 0.2 to 1, optimally about 0.4, weight percent, whereas the supplemental viscosifier is present in the spotting pill in an amount (similarly based) ranging from 0.01 to 1, preferably from 0.05 to 0.5, optimally 0.15, weight percent. The surfactant is incorporated into the spotting pill in an amount (based on the liquid portion of the spotting fluid) ranging from 0.2 to 10, preferably 0.5 to 5, optimally about 1, weight percent. Water generally provides the balance of the fluid portion; however, other additives known to those skilled in the art may be usefully present.

The invention will be further understood by reference to the following Examples which illustrate a preferred form of the invention.

EXAMPLES 1-19

Sticking force was measured using the Amoco Sticking Force Test as described by Park, Arthur; Lummus, J. L.; *The Oil and Gas Journal;* Nov. 26, 1962; pp. 62-66 and Weintritt, Donald; *Oil Patch;* January 1983; pp. 11-14 on various alkylene glycol ethers and the results, including calculated reduction of sticking force compared with the sticking force in an untreated system are set forth in Table I.

TABLE I

| EX. | RELEASE AGENT OF THE INVENTION | STICKING FORCE | % REDUCTION |
|---|---|---|---|
| 1 | Diethylene glycol monobutyl ether | 2.28 | 44.39 |
| 2 | Triethylene glycol monobutyl ether | 1.75 | 57.32 |
| 3 | Ethylene glycol monobutyl ether | 1.85 | 54.88 |
| 4 | Diethylene glycol diethyl ether | 2.10 | 48.78 |
| 5 | Diethylene glycol monobutyl ether | 2.18 | 46.83 |
| 6 | Ethylene glycol monobutyl ether | 2.25 | 45.12 |
| 7 | Diethylene glycol dimethyl ether | 2.43 | 40.73 |
| 8 | Tetraethylene glycol dimethyl ether | 2.45 | 40.24 |
| 9 | Diethylene glycol monoethyl ether | 2.50 | 39.02 |
| 10 | Polyethylene glycol methyl ether, Mw = 750 | 2.50 | 39.02 |
| 11 | Diethylene glycol monomethyl ether | 2.53 | 38.29 |
| 12 | Ethylene glycol dimethyl ether | 2.58 | 37.07 |
| 13 | Triethylene glycol dimethyl ether | 2.65 | 35.37 |
| 14 | Ethylene glycol monoethylether | 2.68 | 34.63 |
| 15 | Polyethylene glycol monomethyl ether, Mw = 350 | 2.73 | 33.41 |
| 16 | Ethylene glycol diethyl ether | 2.75 | 32.93 |
| 17 | Diethylene glycol diethyl ether | 2.78 | 32.20 |
| 18 | Ethylene glycol monomethyl ether | 2.95 | 28.05 |
| 19 | Polyethylene glycol monomethyl ether, Mw = 550 | 3.03 | 26.10 |

EXAMPLE 20

A liquid formulation used in the practice of the invention is of the following composition:

| COMPONENT | WT % |
|---|---|
| Mixed monobutyl ethers[1] | 45 |
| Viscosifier[2] | 0.4 |
| Supplemental Viscosifier[3] | 0.15 |
| Surfactant[4] | 1.0 |
| Water | 53.45 |

[1]Commercially available as Glycol Ether HB from ICI Americas, Wilmington Delaware and believed to be a mixture of ethylene glycol monobutyl ether and poly(ethylene glycol) monobutyl ethers with a degree of polymerization in the range of 2 to 5.
[2]Commercially available as Acrysol-ICS-1 (30% active) from Rohm & Haas, Philadelphia, Pennsylvania and reported to be a copolymer of methacrylic acid and an ethoxylated sterol acrylate.
[3]Commercially available as Alco Print PTF (50% active) from Allied Colloids, Inc., Suffolk, Virginia and believed to be a crosslinked water-swellable polyacrylamide.
[4]Commercially available as Mazamide from Mazer Chemicals Inc., Gwenes, Illinois and believed to be a 1:1 molar reaction product of coconut oil and diethanolamine.

The spotting pill would be prepared by admixture of the above liquid formulation with barite or similar solid weighting material at the drill site by the drilling fluids personnel at the time the string is stuck. The amount of barite admixed would be determined by the personnel and at a level appropriate for his need, although generally, the fluid density of the spotting pill would be comparable to that of the drilling mud.

A spotting pill was prepared in the laboratory according to the formulation and weighted to a density of 15 lb/gal with barite. Testing of the ability of this formulation, No. 11967-57.3, to reduce sticking force in the Amoco test (previously described, for Examples 1-19), was carried out and compared to leading commercial oil based formulations. The results of this test shown in Table II verified the superiority of the subject formulation, 11967-57.3, in the reduction of sticking force.

TABLE II

| Sample No. | Release Agent | Density lb/gal | % Reduction of Sticking Force |
|---|---|---|---|
| 1 | 11967-57.3 | 15 | 31 |
| 2 | Pipe Lax[1] | 15 | 18 |
| 3 | Clean Spot[2] | 15 | 30 |
| 4 | TekMud 8607[3] | 15 | 13 |

[1]Sold by Magcobar Division of Dresser Industries, Houston, Texas.
[2]Sold by Delta Mud and Chemical, Division of Chromalloy American, Homa, Louisiana.
[3]Sold by Exxon Chemical Americas, Houston, Texas.

What is claimed is:

1. An improved method of releasing a stuck drill string in the borehole of an underground formation during drilling operations employing a drilling fluid which comprises contacting the borehole zone contiguous with said stuck drill string with a spotting pill effective to reduce the annular pressure exerted by the drilling fluid against the stuck drill string and to release said stuck drill string, said spotting pill being comprised of an alkylene glycol ether of the class consisting of alkylene glycol ether, poly(alkylene glycol) ether and mixtures thereof.

2. The method according to claim 1 wherein said ether is a monoether.

3. The method according to claim 1 wherein said ether is a diether.

4. The method according to claim 1 wherein said composition has at least a viscosifying amount of a viscosifying agent.

5. The method according to claim 1 wherein said alkylene glycol ether is a mixture of ethylene glycol monobutyl ether and poly(ethylene glycol) monobutyl ether with a degree of polymerization in the range of 2 to 5 and is present in an amount ranging from 20 to 100 percent by weight of the fluid portion of said pill.

6. The method according to claim 1 wherein said pill is a solids weighted aqueous fluid, said fluid comprising from 30 to 70 percent by weight of a mixture of ethylene glycol monobutyl ether and poly(ethylene glycol) monobutyl ethers with a degree of polymerization in the range of 2 to 5, from 0.2 to 1.0 percent by weight of a copolymer of methacrylic acid and an ethoxylated stearol acrylate, from 0.05 to 0.5 percent by weight of a crosslinked polyacrylamide, from 0.5 to 5 percent by weight of a coconut fatty acid alkanolamide surfactant and, the balance water and said pill being weighted with a sufficient amount of solid weighting material to provide a fluid density appropriate for release of said stuck drill string.

7. The method according to claim 6 wherein said weighting material is barite.

* * * * *